UNITED STATES PATENT OFFICE.

ROBERTS BARTHOLOW, OF THE UNITED STATES ARMY.

IMPROVED SOLID CARTRIDGE.

Specification forming part of Letters Patent No. 36,066, dated August 5, 1862.

To all whom it may concern:

Be it known that I, ROBERTS BARTHOLOW, of the United States Army, have invented certain new and useful Improvements in Solid Water-Proof Cartridges; and I do hereby declare that the following is a full, clear, and exact description of the mode of manufacturing the same:

I use in the manufacture of the composition photographic collodion-cotton dissolved in a mixture of alcohol and sulphuric ether, in proportion of one-third of the former to two-thirds of the latter, as follows: photographic collodion-cotton for negatives and positives, one ounce; alcohol, ten ounces; sulphuric ether, eighteen ounces.

The collodion, thus prepared, is mixed with mealed and granulated gunpowder in the proportion of one-third of the former to two-thirds of the latter, according to the following formula: mealed powder, five ounces; granulated powder, eleven ounces; collodion, six ounces, fluid.

These ingredients are thoroughly incorporated and pressed into suitable molds or molded without pressure.

The collodion may also be incorporated with gunpowder, granulated, in the proportion of six ounces of collodion to one pound of powder. The collodion thus prepared answers as a coating to render the solid cartridge waterproof.

The cartridges may be molded in the end of the ball, or they may be attached to the ball by glue or by any other known method.

There are other ways of preparing collodion to be used for this purpose, but the various modifications effect the same object; hence I do not wish to confine myself to this mode of preparing the collodion.

Having thus fully described my invention, what I claim as new, and desire to secure by Letters Patent, is—

The use of the within-described water-proof solid cartridge, compounded and constructed substantially as herein specified.

In witness that I claim the foregoing I have hereunto set my hand in the presence of witnesses.

ROBERTS BARTHOLOW.

Witnesses:
   C. M. ALEXANDER,
   CHARLES ALEXANDER.